United States Patent

[11] 3,623,698

| [72] | Inventors | John R. Couper<br>Loveland;<br>Myer J. Schaffner, Arvada, both of Colo. |
|---|---|---|
| [21] | Appl. No. | 7,058 |
| [22] | Filed | Jan. 30, 1970 |
| [45] | Patented | Nov. 30, 1971 |
| [73] | Assignee | EZ Serve, Inc.<br>Arvada, Colo. |

[54] REMOTE CONTROLLED OIL AND LIQUID DRAIN VALVE
3 Claims, 6 Drawing Figs.

| [52] | U.S. Cl. | 251/294 |
|---|---|---|
| [51] | Int. Cl. | F16k 31/46 |
| [50] | Field of Search | 251/131, 294, 350, 349 |

[56] References Cited
UNITED STATES PATENTS

| 1,141,768 | 6/1915 | Campbell, Jr. | 251/349 X |
| 1,529,900 | 3/1925 | Mayer | 251/294 |
| 1,557,390 | 10/1925 | Tolk et al. | 251/294 X |
| 1,619,117 | 3/1927 | Gray | 251/294 X |
| 1,626,089 | 4/1927 | Jakosky | 251/294 X |
| 1,710,488 | 4/1929 | Oliphant | 251/294 X |
| 2,657,705 | 11/1953 | Gerhard et al. | 251/294 X |
| 2,661,022 | 12/1953 | Latour | 251/131 X |
| 2,966,328 | 12/1960 | Burnworth | 251/294 X |
| 3,537,679 | 11/1970 | McCarthy et al. | 251/294 X |

*Primary Examiner*—Samuel Scott
*Attorney*—Richard D. Law

ABSTRACT: A drain valve for oil and other liquids includes a plug for the outlet for such liquids having a passage therethrough, a connector in the passage in the plug and valve with a downwardly directed outlet part controlling the passage in the connector. A flexible, sheathed cable extends from the valve to an accessible location, preferably under the hood, for opening and closing the valve. Means are provided for biasing the valve in closed position

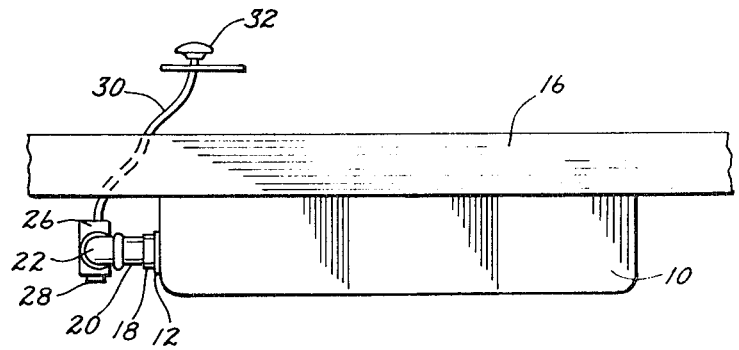
FIG. 1
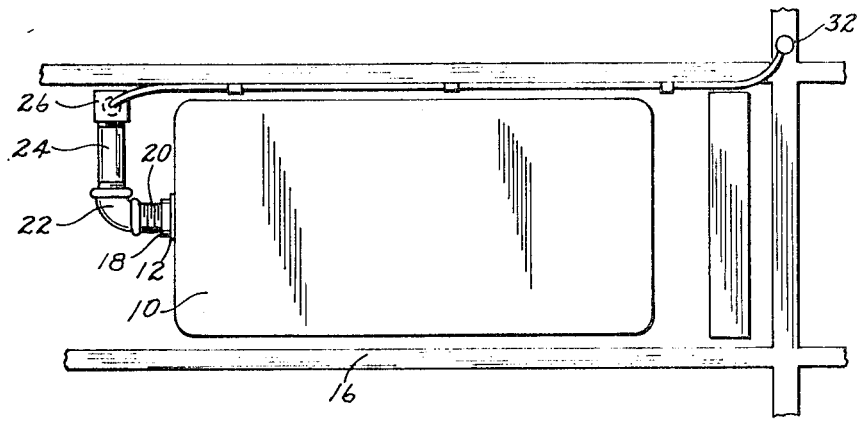
FIG. 2
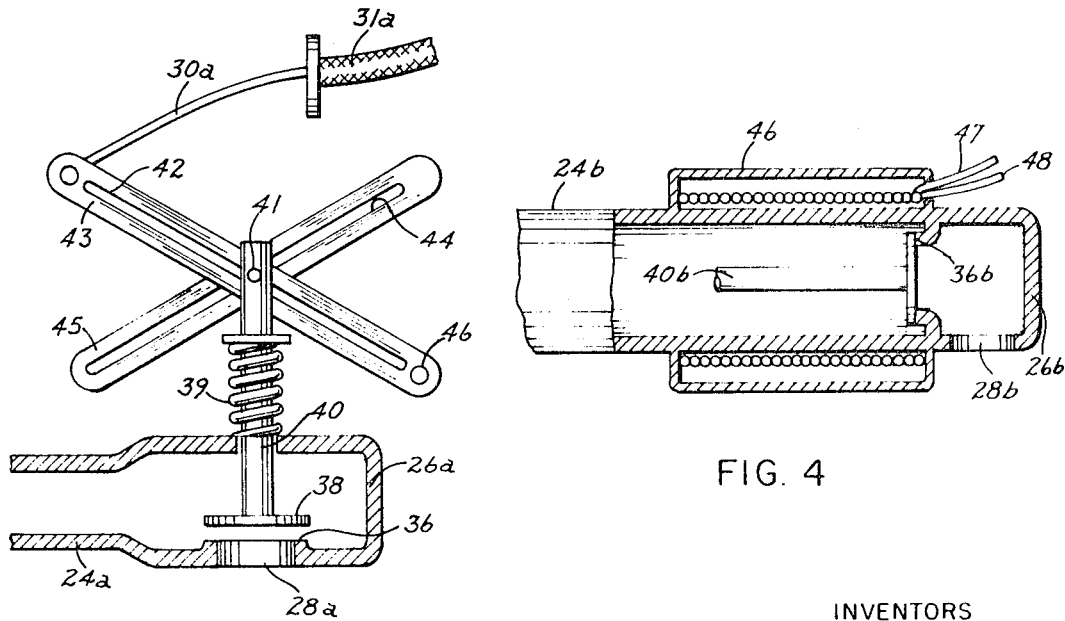
FIG. 3
FIG. 4
INVENTORS
JOHN R. COUPER
MEYER J. SCHAFFNER
BY Richard H. Law
ATTORNEY

REMOTE CONTROLLED OIL AND LIQUID DRAIN VALVE

More and more automobile owners and operators are tending toward the do-it-yourself maintenance of their automobiles. This is particularly true for the minor maintenance such as use of self-service gas pumps, self-operated car washes, adding the necessary oil, hydraulic fluid, brake fluid and the like to maintain the desired levels in the reservoirs for such liquids. Changing the oil in crankcase of the automobile engine has not achieved the popularity as the other do-it-yourself items, since it involves a number of problems.

Changing oil in an automobile engine involves getting under the vehicle, having the correct wrench, providing a receptacle for the used oil, etc. Modern automobiles have a low profile and a very small clearance. The clearance on most automobiles is not sufficient to permit an adult to crawl under it for removal of the oil drain plug. If one side of the front end is jacked up or the front wheel pulled up on the curb to permit a person to crawl under the auto, metal chips and shavings settle into the lowest portion of the pan away from the drain. Thus, for a satisfactory oil change, it is necessary to maintain the car level. This generally requires the use of a hoist in a service station, with the result that oil change is conducted at the price demanded by the service station, rather than the considerably less expensive oil from discount sources, usually the same brand of oil. The differential may be several dollars in oil along.

One advantage of frequent oil changes, at mileages far less than suggested by the engine manufacturer, is the savings in wear and tear on the engine and fewer oil filter changes. For instances, some manufacturers suggest an oil change every 3,000 miles or 3 months, which ever comes first, and suggest a filter change. By changing oil every 1,200 to 1,500 miles, the oil does not break down between changes, and the filter does not need to be changed every oil change. By using the discount oil and the owner doing it, the cost may be as little as one-third or one-fourth of the cost of the oil change in the service station.

It is, therefore, included among the objects and advantages of the present invention, to provide a simple means for opening and closing a liquid drain valve.

Another object of the invention is to provide a remote means for controlling a liquid drain valve for an automobile engine.

An additional object of the invention is to provide a remote-controlled oil drain valve for an automobile engine.

A further object of the invention is to provide a remotely controlled automobile engine oil drain valve which provides a vertical discharge stream of oil from the oil pan of an automobile engine.

These and other objects and advantages of the invention may be ascertained by reference to the following description and appended illustrations, in which:

FIG. 1 is a side elevational view of a portion of an automobile engine, particularly the oil pan;

FIG. 2 is a top plan schematic view of the device of FIG. 1, including an additional front portion of the vehicle;

FIG. 3 is a generally schematic side view of one form of a positive lock, shutoff drain valve according to the invention;

FIG. 4 is a schematic side view of a modified valve according to the invention;

Figure 5:
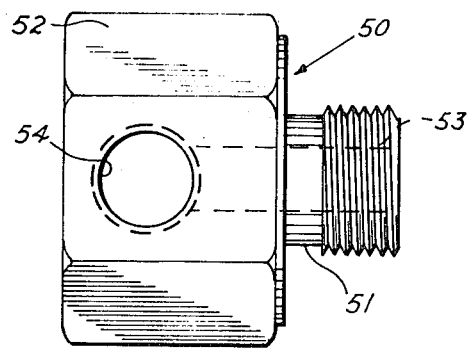
FIG. 5 is a side view of an oil drain plug for use with the valve of the invention.

In general, the device of the invention provides a plug with a passage therethrough, replacing the conventional solid plug, for the oil drain opening of an automobile engine pan. A connector is connected between the plug and a valve which has a vertically downwardly directed outlet. A manual, remotely operated control means, permits opening and closing the valve from a position spaced from the drain. Means are provided for maintaining a positive, biased pressure on the valve in closed position to prevent accidental opening of the valve during operation of the vehicle.

In the device illustrated in FIGS. 1 and 2, an automobile oil pan 10 is provided with a drain outlet 12. The engine, and attached pan, is generally mounted between frame elements 14 and 16, which extend beyond the engine in both directions. A bushing 18 is threaded into the drain outlet, and short nipple 20 is threaded into the bushing. An ell 22 mounted on the nipple directs the oil drain to the side of the engine. A nipple 24 extends the drain line to a valve 26, which has a vertically, downwardly directed outlet 28. A length of manipulating, sheathed cable 30 provides means for opening and closing the valve. The cable has a handle 32 for manually manipulating the cable for controlling the valve.

One form of valve is illustrated in FIG. 3, wherein a type of globe valve is used for the oil drain. The valve consists of a housing 26a, having a downwardly directed outlet 28a. The valve is connected to a nipple 24a at its inlet part. The valve includes a seat 36, closed by a valve member 38 mounted on a stem 40. A spring 39 biases the valve member on the seat. The valve is opened and closed by lifting and lowering the stem and its associated valve member. The stem includes a lateral member 41, which rides in slots 42 (in pivoted arm 43) and in slot 44 (in stationary arm 45). The arm 43 is pivoted by pivot pin 46. A cable 30a mounted in sheath 31a is attached to the arm 43 on the end opposite the pivot pin 46. The handle 32 may be mounted under the hood of the engine in easy hand grasping position.

To open valve 26a, the cable is pulled, which pivots arm 43, forcing lateral member along slot 42 and up along the slot 44 of the stationary arm 45. This tilts the stem and the valve member opening the valve. For closing, the cable is pushed, pivoting arm 43 downwardly and returning the stem to upright position with the valve closed. The spring biases the valve closed, and pushing the cable adds pressure of closing on the valve member. The action prevents accidental opening of the valve even under the bouncing and jarring of the traveling automobile.

An electrically operated remote valve is illustrated in FIG. 4. A housing 26b has a downwardly directed opening 28b, a valve seat 36b and a valve member 38b. A paramagnetic valve stem 40b attached to the valve member extends away from the valve seat. A connector 24b attaches the valve to the line from the engine oil drain outlet. A solenoid coil 46, provided with electricity by conductors 47 and 48. The structure is arranged as a solenoid, whereby charging the coil pulls the stem and attached valve member into equilibrium in the produced magnetic field, thereby opening the valve. Where desired, a spring may be inserted in the valve to bias the valve member into closed position. The weight of the oil in the pan, also, aids in keeping the valve closed during operation of the vehicle. The control for the valve may, preferably, be in the passenger compartment, where a simple switch activates the coil and opens the valve.

Using the drain line assembly of FIGS. 1 and 2 generally requires a securing of the line to the vehicle frame or body, as it may extend a substantial distance. A simple piece of punched strap provides a simple means of securing the line to prevent it from accidentally turning downwardly where it might be caught by a projection from the road, and torn off.

Figure 6:
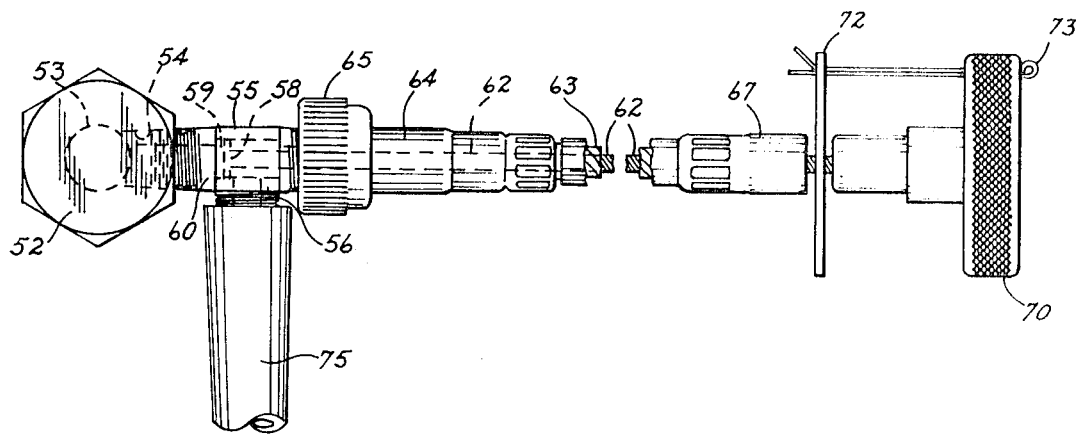
FIG. 6 is an assembly view of a further modified form of the remote-controlled valve of the invention.

A modified form of remote controlled valve is shown in FIGS. 5 and 6, wherein a plug, shown in general by numeral 50, has a hollow, threaded member 51, arranged for a threaded connection with the drain outlet of the pan of an engine. The dimensions necessary to fit most automobiles are few, so only a few sizes are necessary to stock. The threaded member 51 is integrally attached to a hexagonal body member 52. For all sizes of members 51, the body may be the same dimensions, which reduces machining costs of this particular part. A passage 53 in member 53 connects with a threaded passage 54 in the hex body member 52. Threaded into the passage 54 is petcock 55, having a 90° outlet 56. A plug-type valve member 58 is threaded engaged with the valve body 55 for opening and closing on valve seat 59. A gasket 60 provides a tight connection between the valve body and the hex body. A cable 62 is secured to the valve member 58, so that rotation of the cable opens and closes the valve member on the seat. The cable is provided with a sheath 63, having a connector 64 at one end, arranged to be held on the valve body by a threaded cap 65, and a connector 67 at the opposite end, arranged for connection to a panel or the like. A manipulating handle 70 is fastened to the cable, providing means for rotating the cable. A hole through the handle and a hole in a supporting panel 72 accommodates a pin or cotter pin 73, which secures the handle in fixed position during operation of the vehicle. By overturning the cable, pressure may be applied on the closed valve member on the seat, and the pin or cotter pin keeps the pressure on the closed valve.

A short length of plastic tubing 75 directs the flow of oil from the drain valve to pan placed under the vehicle. The tubing gives the operator a target for placing the oil catch pan, which must usually be pushed into place with a stick, rod or the like since the adult cannot crawl under the auto.

Oil drain outlets vary in position from make to make of automobile. The plug of FIGS. 5 and 6 provides a simple connector which permits the outlet of the valve to be placed in the down position, whether the drain outlet is on the bottom, back, front, or side of the pan. It is highly desirable to have the oil from the pan drain vertically downwardly, as the stream of oil does not vary its position as the supply diminishes. For instance, with the plug on back side of the pan, when the pan is full oil gushes out in a stream arcing a number of inches from the drain; but as the supply diminishes, the stream arcs less and less. Thus a container with a reasonably small opening may be used with the present valve with only the initial positioning.

The device has been described primarily as an oil drain; however, it may be used for the drain of the radiator, hydraulic fluid, etc.

We claim:

1. A remotely controlled drain valve for liquids from reservoirs on automobiles including engine oil sumps, comprising conduit means for fastening in the drain outlet of such a reservoir; valve means having an inlet and a downwardly directed outlet, said valve means including a valve seat and a rotary valve member threadably engaged in said valve means for selectively abutting said seat for opening and closing said valve means; connector means integral with said conduit means connecting said inlet of said valve means with said conduit means and providing communication therewith; a flexible, elongated, sheathed cable secured at one end to said valve means and at the other end at an easily accessible point remote from said valve; said actuating cable arranged for rotating said rotary valve member for opening and closing said valve means; and means biasing said valve member in closed position including a handle at the end remote from said valve for rotating said cable and holding means for said handle when said handle is rotated past the closure of said valve member so as to maintain closure-biasing pressure on said valve means.

2. A remotely controlled drain valve according to claim 1 wherein said easily accessible point is under the hood of the engine compartment of the automobile.

3. A remotely controlled drain valve according to claim 1 being further characterized by a short length of flexible tubing secured to the outlet of said valve and extending downwardly therefrom.

* * * * *